United States Patent [19]

Platter

[11] 4,361,029

[45] Nov. 30, 1982

[54] PNEUMATIC RADIUS SENSOR

[75] Inventor: Sanford Platter, Boulder, Colo.

[73] Assignee: Computer Peripherals, Inc., Minneapolis, Minn.

[21] Appl. No.: 153,248

[22] Filed: May 27, 1980

[51] Int. Cl.³ .................... B65H 17/32; G01B 13/00
[52] U.S. Cl. .................................. 73/37.7; 73/37.5; 226/97
[58] Field of Search .............. 73/37.5, 37.6, 37.7, 73/143, 37.9; 360/102, 137

[56] References Cited

U.S. PATENT DOCUMENTS

| 2,636,379 | 4/1953 | Van Dorn | 73/37.8 |
| 3,186,326 | 6/1965 | Schmidt | 226/97 X |
| 3,201,985 | 8/1965 | Williams | 73/37.7 X |
| 3,327,916 | 6/1967 | Weidenhammer et al. | 360/102 X |
| 3,439,536 | 4/1969 | Cushman | 73/159 |
| 3,630,170 | 12/1971 | Christo | 360/137 X |
| 3,754,443 | 8/1973 | Hyer | 73/37.6 |
| 4,041,770 | 8/1977 | Staheli et al. | 73/37.5 |

FOREIGN PATENT DOCUMENTS

| 52-2453 | 1/1977 | Japan | 73/37.9 |
| 531190 | 10/1976 | U.S.S.R. | 360/102 |

Primary Examiner—Daniel M. Yasich
Attorney, Agent, or Firm—Robert M. Angus; Joseph A. Genovese

[57] ABSTRACT

A pneumatic radius sensor is embodied in a fluid bearing, such as an air bearing for a tape transport, to determine the radius of tape wrapped on an adjacent supply or take up reel. The sensor includes a chamber in fluid communication through a plurality of metered orifii to the region of the changing wrap angle of the tape on the air bearing, the plurality of orifii being arranged to provide an essentially linear relationship between pressure in the chamber and the wrap angle of the tape. Pressure sensing means in the chamber senses the pressure therein, so the radius of tape on the adjacent reel can be determined.

6 Claims, 3 Drawing Figures

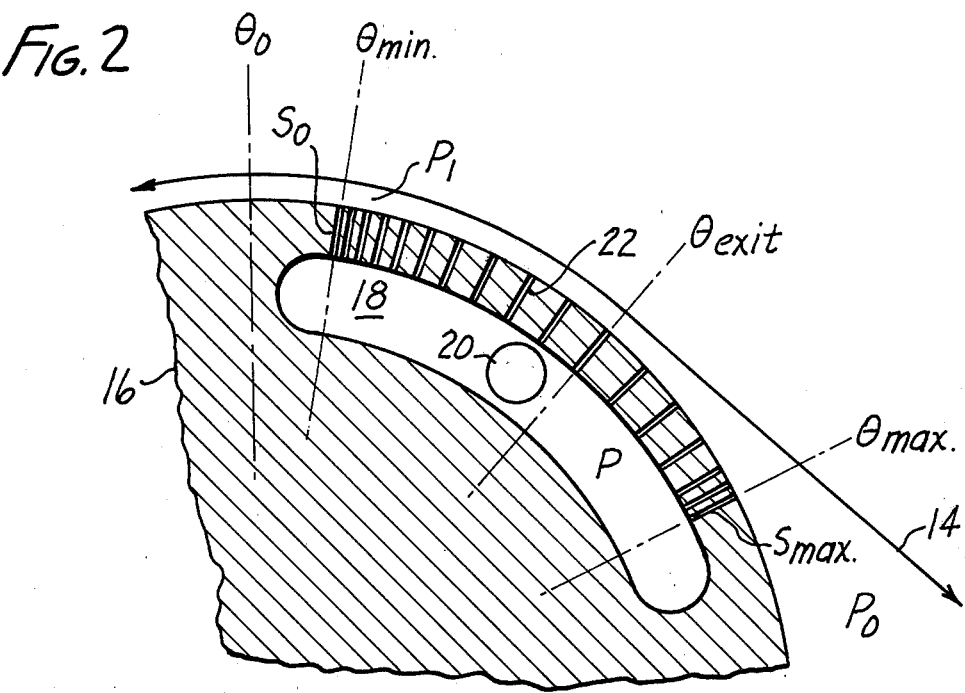
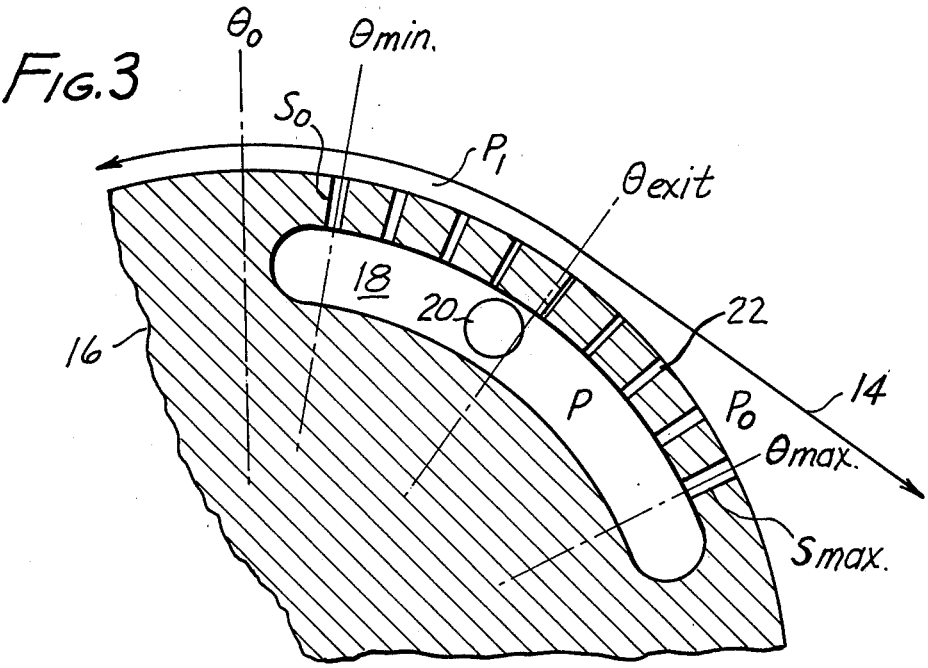

PNEUMATIC RADIUS SENSOR

This invention relates to a pneumatic radius sensor, and particularly to a radius sensor useful for determining the radius of tape wound on the take up or supply reel of a flexible tape transport.

In the case of a reel-to-reel transport, if the radius of the tape on the take up or supply reel is known, and the reel rotational velocity is known, the tape velocity may be determined without the need of a tachometer to monitor tape velocity. More importantly, by knowing the amount of tape on the reel at any given time, the reel rotational velocity may by controlled to thereby control tape velocity past the read and write heads as well as for controlling tape velocity during high-speed rewind. The present invention particularly concerns a pneumatic radius sensor for measuring the radius of tape wound on a take up or supply reel in a tape transport.

In certain tape transports, it is known to utilize air pressure for hydrostatic air bearings to support the tape as well as for other purposes in the transport. Accordingly, and particularly in tape transports utilized for computer applications, a source of regulated air pressure is ordinarily readily available. Accordingly, the present invention makes use of the existing air pressure within a tape transport for determining the amount of tape wrapped on the supply and take up reels.

It is the object of the invention to provide a pneumatic radius sensor for determining the radius of tape wrapped onto the supply and/or take up reels of a tape transport.

In accordance with the present invention, an air bearing is placed in the tape path at the exit of a supply reel or entrance to a take up reel. A series of orifii are located in the periphery of the bearing encompassing the maximum and minimum entrance or exit zone for the tape. The orifii are in fluid communication with a chamber or plenum within the air bearing. A regulated source of fluid, such as air, is emitted to the region supporting the tape, some of such fluid being emitted through orifii adjacent the tape to raise the pressure in the chamber, while some fluid in the chamber escapes through other orifii not adjacent the tape to lower the pressure in the chamber. The individual ones of the plurality of orifii are geometrically spaced around the wrap angle of the tape about the bearing in such a way as to provide a linear relationship between the wrap angle and the pressure within the plenum.

In operation of the sensor, fluid trapped beneath the tape and adjacent some of the orifii is transmitted through the orifii into the chamber to raise the pressure therein, whereas those orifii exposed to the atmosphere beyond the wrap angle of the tape permits fluid to flow out of the chamber to reduce the pressure in the plenum. By arranging the orifii in such a way that the wrap angle is lineary proportional to the pressure within the chamber, the wrap angle may be determined from the pressure on the pressure sensor within the chamber or plenum. In the machine, the wrap angle on the air bearing is geometrically related to the radius of the tape on the adjacent supply or take up reel. Consequently, the radius of the tape on the reel may be determined by measuring the pressure within the chamber of the air bearing.

One feature of the invention resides in a technique for determining the geometric relationship of the individual orifii in the air bearing.

The above and other features of this invention will be more fully understood from the following detailed description and the accompanying drawings, in which:

FIG. 2 is an enlarged sectional view of a portion of the air bearing illustrating the details of the radius sensor in accordance with the presently preferred embodiment of the present invention; and FIG. 3 is an enlarged sectional view of a portion of an air bearing having a radius sensor in accordance with a modification of the present invention.

Figure 1:
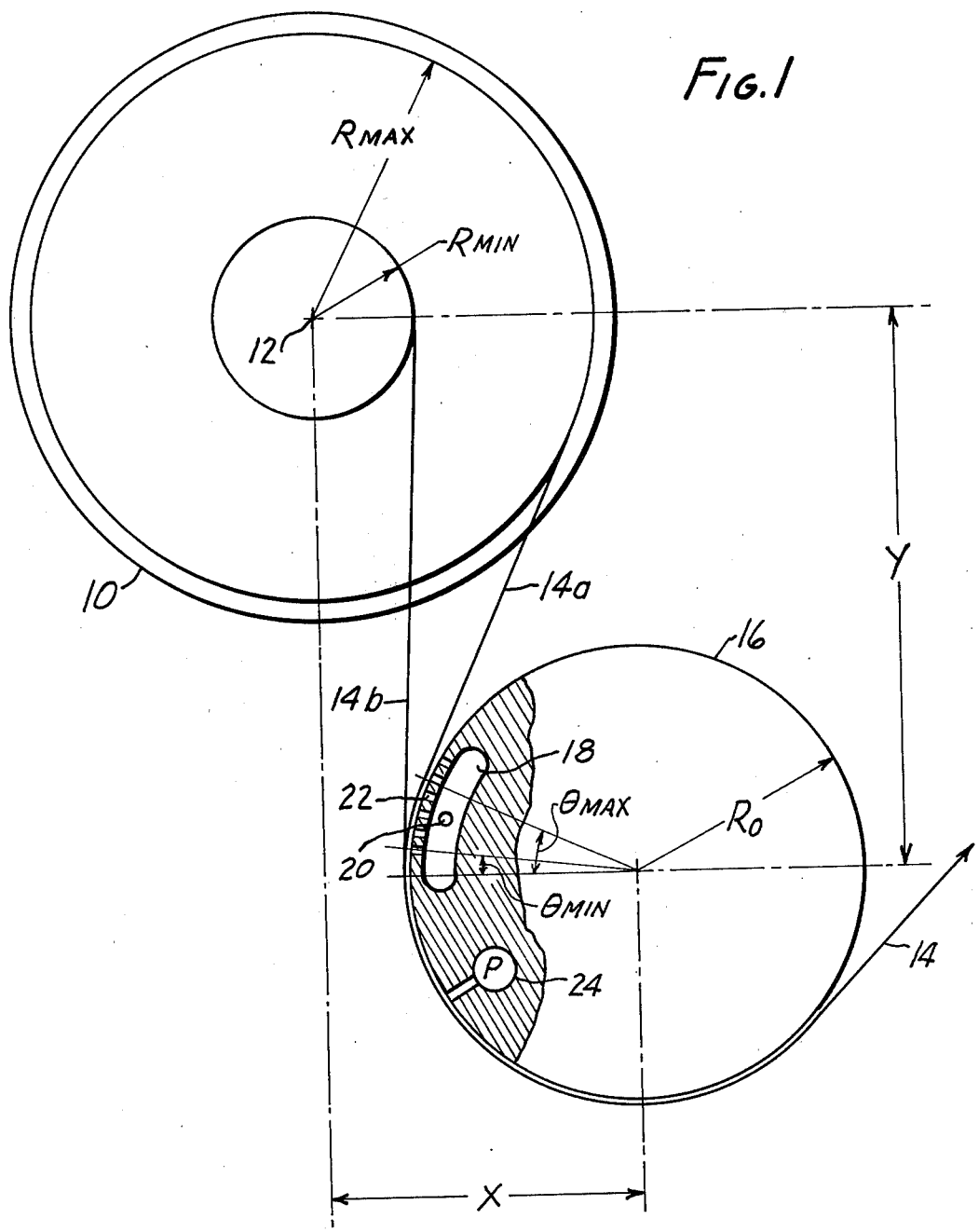
FIG. 1 is a schematic diagram illustrating the relationship of the air bearing containing a radius sensor in accordance with the presently preferred embodiment of the present invention to the adjacent take up or supply reel.

Referring to the drawings, and particularly to FIG. 1, there is illustrated a schematic diagram of the relationship of the air bearing containing a radius sensor in accordance with the presently preferred embodiment of the present invention.

As shown particularly in FIG. 1, a reel 10 is arranged on a shaft (not shown) to rotate about axis 12 to receive a supply magnetic tape 14. A non-rotating air bearing 16 is arranged adjacent to tape reel 10 so that tape 14 is wrapped partially around the peripheral surface of bearing 16. Reel 10 is capable of holding a supply of tape 14 wrapped there around such that the radius of the tape wrapped on the reel may vary between a maximum radius, Rmax, and a minimum radius, Rmin, so that the tape path to or from reel 10 will vary between the positions shown at 14a and 14b. In a case of a supply reel, the radius of the tape will ordinarily vary from Rmax to Rmin, or as in the case of take up reel, the radius of the tape on the reel will vary from Rmin to Rmax.

As the radius of tape on reel 10 varies between Rmax to Rmin, the wrap angle on bearing 16 varies between $\theta$ max and $\theta$ min. It is in the region of the changing wrap angle that the radius sensor in accordance with presently preferred embodiment is placed.

As shown in FIG. 1, a supply 24 of fluid, such as air, under pressure, provides fluid to support tape 14. Plenum 18 contains a pressure sensitive transducer 20, such as a doped silicone diaphram sensor, piezo-electric pressure sensor, photo-optic bellows pressure sensor or the like. A series of orifii 22 are in fluid communication between plenum chamber 18 and the surface of the air bearing in the region between $\theta$ min and $\theta$ max. It can be shown that the radius, Rr, of tape 14 on reel 10 is related to the wrap angle $\theta$ by the following relationship:

$$Rr = X \cos \theta + Y \sin \theta - Rb \qquad (1)$$

where X and Y are the horizontal and vertical distances, respectively, between the axes of reel 10 and bearing 16, Rb is the radius of the bearing, and $\theta$ is the exit angle of the tape leaving or entering the bearing. Therefore, since X, Y and Rb are known from the geometry of the transport if $\theta$ can be determined, the radius of tape on the reel can be ascertained.

Referring to FIG. 2, the bearing pressure P1 is disposed in the region between the tape and the bearing surface, as from source 24. Consequently, fluid will pass through the metering orifii 22 into plenum 18 from the region of high pressure P1. At the same time, fluid will escape from plenum 18 through other orifii 22 to the region of atmospheric pressure Po. Consequently, the pressure P within plenum 18 is a function of the bearing pressure P1, the number of orifii open to the atmosphere, and the number of orifii open to the bearing pressure. Hence, it can be shown that the pressure within plenum 18 is:

$$P = \frac{P1}{1 + N^2} \quad (2)$$

where $$N = \frac{No}{Nc} \quad (3)$$

where No is the number of orifii open to the atmosphere (Po) and Nc is the number of orifii open to the bearing pressure (P1). To maintain a linear relationship between the pressure P within the plenum and the wrap angle $\theta$, for a given orifii size, the orifii must be spaced in accordance with the following relationships:

$$Sn = \frac{Smax}{2}\left(\frac{n}{N/2}\right)^2 \text{ for } Sn \leq \frac{Smax}{2} \quad (4)$$

and $$Sn = Smax - \frac{Smax}{2}\left(\frac{N-n}{N/2}\right)^2 \text{ for } Sn \geq \frac{Smax}{2} \quad (5)$$

where Sn is the distance between the orifii So (at $\theta$ min) and the orifice (Sn) being located, n is the number of the orifice (which can be determined by the number of orifii between So and Sn plus 1), N is the total number of orifii less 1, and Smax is the total distance between $\theta$ min and $\theta$ max. From the foregoing, it can be shown that $$Smax = Rb \, (\theta \max - \theta \min) \quad (6)$$

where $\theta$ is measured in radians.

It can be shown that with the spacing of orifii as set forth in equations (4) and (5), the wrap angle $\theta$ is directly proportional to the pressure P within the plenum 18. Thus, $$\theta = KP \quad (7)$$

where K is a constant dependant upon orifice radius. Since Smax is a function of $\theta$, which in turn is a function of K, the relationships set forth in equations (4) and (5) provide a linear relationship between pressure and wrap angle so long as the orifii all are of uniform radius.

An inspection of equations (4) and (5) will reveal that the pattern of orifii is such that the orifii closest to So and Smax are spaced closest together, with the pattern symetrical about the center wrap angle (Smax/2).

Instead of spacing the orifii pattern in accordance with equations (4) and (5), the orifii may be equally spaced, as shown in FIG. 3, with the orifii having areas of increasing size toward So and Smax. To maintain an essentially linear relationship between pressure P within the plenum and the wrap angle, for a given orifice spacing, the orifii radius must be dimensioned in accordance with the following relationships:

$$Rn = Rmin\left(\frac{N-n}{N/2}\right)^4 \text{ for } Sn \leq Smax/2 \quad (8)$$

and $$Rn = Rmin\left(\frac{n}{N/2}\right)^4 \text{ for } Sn \geq Smax/2 \quad (9)$$

where Rn is the radius of the orifice at Sn and Rmin is the radius of the smallest orifice (at Smax/2).

It can be appreciated that with the pattern of orifii governed by either equations (4) and (5) or equations (8) and (9), the wrap angle $\theta$ varies in a linear fashion with pressure, as expressed in equation (7). Hence, equation (1) may be rewritten as $$Rr = X \cos (KP) + Y \sin (KP) - Rb. \quad (10)$$

Therefore, by measuring the pressure P within chamber 18, the radius of tape on reel 10 may be ascertained. Conveniently, a suitable microprocessor or look-up table may be employed to determine the radius of the tape.

In one case where orifice diameter was 0.010 inch, an orifice pattern was developed employing the equations (4) and (5) to detect the radius of tape on a reel for a change in wrap angle of 0.65 radians on a 1.0 inch radius bearing. Air flow through the sensor was 0.07 CFM from an air bearing supporting $\frac{1}{2}$ inch computer tape with a 0.07 CFM flow. The radius of the tape on the reel was measured to an accuracy of $\pm 2\%$.

The present invention thus provides a simple, effective radius sensor for detecting the radius of tape on a reel. The apparatus is effective in operation and low in cost.

This invention is not to be limited by the embodiments shown in the drawings as described in the description, which are given by way of example and not of limitation, but only in accordance with the scope of the appended claims.

What is claimed is:

1. Apparatus for determining the outer radius of flexible tape wrapped about a reel, comprising: a fluid bearing positioned adjacent said reel, said bearing having an arcuate periphery about which a portion of the flexible tape is wrapped, said bearing having fluid supply means for supplying fluid to a region between said tape and said periphery to form a fluid bearing supporting said tape, said fluid in said region being at a bearing pressure; a fluid chamber within said bearing; a plurality of orifii in fluid communication between said chamber and said periphery of said bearing, said orifii being arranged in a pattern extending along said periphery between a maximum location and a minimum location at which the tape travelling to or from said reel may first be supported by said fluid, said orifii being so disposed and arranged as to admit fluid into said chamber through those orifii in communication with said region of the periphery having fluid supporting said tape and to expel fluid from said chamber through those orifii not in communication with said region when said tape is at less than said maximum location, said orifii being further disposed and arranged as to provide a fluid pressure within said chamber which varies at approximately a linear rate between a minimum pressure and a maximum pressure as the first support point for said tape varies between its minimum and maximum locations; and pressure sensing means within said chamber for sensing the fluid pressure within said chamber; whereby the radius of said tape wrapped on said reel can be determined from the fluid pressure in said chamber and the relationship $$Rr = X \cos(KP) + Y \sin(KP) - Rb$$

where X is the horizontal component of the distance between the axis of said reel and the axis of said arcuate periphery of said bearing, Y is the vertical component of the distance between the axis of said reel and the axis of said arcuate periphery of said bearing, Rb is the radius of said arcuate periphery of said bearing, P is the pressure within said chamber and K is a constant.

2. A method of determining the outer radius of flexible tape wrapped around a reel comprising:
providing a fluid bearing adjacent said reel, said bearing having a radius to an arcuate periphery;
wrapping a portion of said tape about a portion of the periphery of said fluid bearing;
providing a source of fluid under pressure to support said tape about the periphery of said bearing;
providing, within said bearing, a fluid chamber and a plurality of orifii in fluid communication between said chamber and the periphery of said bearing, the pattern of said orifii extending along the periphery of said bearing between the maximum and minimum locations at which said tape may first be supported by said fluid as said tape is moved to or from said reel, said orifii being arranged to admit fluid into said chamber through those orifii in communication with that part of the periphery of said bearing supporting said tape and to expel fluid from said chamber through those orifii not in communication with that part of the periphery of said bearing supporting said tape when said tape is at less than said maximum location;
arranging said orifii so that the fluid pressure within said chamber varies at essentially a linear rate between a minimum pressure and a maximum pressure as the first support point for said tape varies between its minimum and maximum locations;
measuring the pressure within said chamber; and
determining the radius of tape on said bearing from the relationship $$Rr = X \cos(KP) + Y \sin(KP) - Rb$$

where X is the horizontal component of the distance between the axis of said reel and the axis of said bearing, Y is the vertical component of the distance between the axis of said reel and the axis of said bearing, Rb is the radius of said bearing, P is the pressure within said chamber and K is a constant.

3. The invention according to claim 1 wherein said orifii are of equal size and are arranged in a pattern determined by the relationships $$Sn = \frac{Smax}{2}\left(\frac{n}{N/2}\right)^2$$

for $Sn \leq Smax/2$, and $$Sn = Smax - \frac{Smax}{2}\left(\frac{N-n}{N/2}\right)^2$$

for $Sn \geq Smax/2$, where Sn is the distance along said periphery from the orifice at the minimum location, Smax is the distance between the minimum and maximum locations, n is number of orifii between the orifice at the minimum location and the orifice at Sn plus 1, and N is the total number of orifii less 1.

4. The invention according to claim 1 wherein said orifii are arranged in equal spacing between the minimum and maximum locations and have radii determined by the relationships $$Rn = Rmin\left(\frac{N-n}{N/2}\right)^4$$

for $Sn \leq Smax/2$, and $$Rn = Rmin\left(\frac{n}{N/2}\right)^4$$

for $Sn \geq Smax/2$, where Rn is the radius of the orifice at Sn, Rmin is the radius of an orifice at Smax/2, Sn is the distance along said periphery from the orifice at the minimum location, Smax is the distance between said minimum and maximum locations, n is the number of orifii between the orifice at the minimum location and the orifice at Sn plus 1, and N is the total number of orifii less 1.

5. The invention according to claim 2 wherein said orifii are of equal size and are arranged in a pattern determined by the relationships $$Sn = \frac{Smax}{2}\left(\frac{n}{N/2}\right)^2$$

for $Sn \leq Smax/2$, and $$Sn = Smax - \frac{Smax}{2}\left(\frac{N-n}{N/2}\right)^2$$

for $Sn \geq Smax/2$, where Sn is the distance along said periphery from the orifice at the minimum location, Smax is the distance between the minimum and maximum locations, n is number of orifii between the orifice at the minimum location and the orifice at Sn plus 1, and N is the total number of orifii less 1.

6. The invention according to claim 2 wherein said orifii are arranged in equal spacing between the minimum and maximum locations and have radii determined by the relationships $$Rn = Rmin\left(\frac{N-n}{N/2}\right)^4$$

for $Sn \leq Smax/2$, and $$Rn = Rmin\left(\frac{n}{N/2}\right)^4$$

for $Sn \geq Smax/2$, where Rn is the radius of the orifice at Sn, Rmin is the radius of an orifice at Smax/2, Sn is the distance along said periphery from the orifice at the minimum location, Smax is the distance between said minimum and maximum locations, n is the number of orifii between the orifice at the minimum location and the orifice at Sn plus 1, and N is the total number of orifii less 1.

* * * * *